United States Patent [19]

Bernardoni et al.

[11] Patent Number: 4,509,466
[45] Date of Patent: Apr. 9, 1985

[54] DIESEL ENGINE WITH AN EFFECTIVE COMPRESSION RATIO SUBSTANTIALLY EQUAL TO THE GEOMETRICAL COMPRESSION RATIO

[75] Inventors: Luigi Bernardoni, Tradate; Umberto Invernizzi, Milan, both of Italy

[73] Assignee: Alfa Romeo Auto S.p.A., Naples, Italy

[21] Appl. No.: 520,848

[22] Filed: Aug. 5, 1983

[30] Foreign Application Priority Data

Aug. 18, 1982 [IT] Italy ................ 22886 A/82

[51] Int. Cl.³ .............................................. F02B 77/00
[52] U.S. Cl. .............................. 123/52 MF; 123/73 V
[58] Field of Search ......... 123/52 M, 52 MB, 52 MF, 123/590, 73 V

[56] References Cited

U.S. PATENT DOCUMENTS 3,815,559  6/1974  Anderson .................. 123/73 V
4,422,416 12/1983  Bernardoni ............... 123/52 MF

FOREIGN PATENT DOCUMENTS 3024812  1/1982  Fed. Rep. of Germany ........ 123/52 MF Primary Examiner—Craig R. Feinberg
Attorney, Agent, or Firm—Charles A. Brown; Charles E. Brown

[57] ABSTRACT

This invention relates to a diesel engine with an effective compression ratio substantially equal to the geometrical compression ratio, the individual intake ducts of said engine being fitted with automatic non-return valves arranged to prevent air flowing to the outside, and disposed immediately upstream of and in series with the normal intake valves.

2 Claims, 2 Drawing Figures

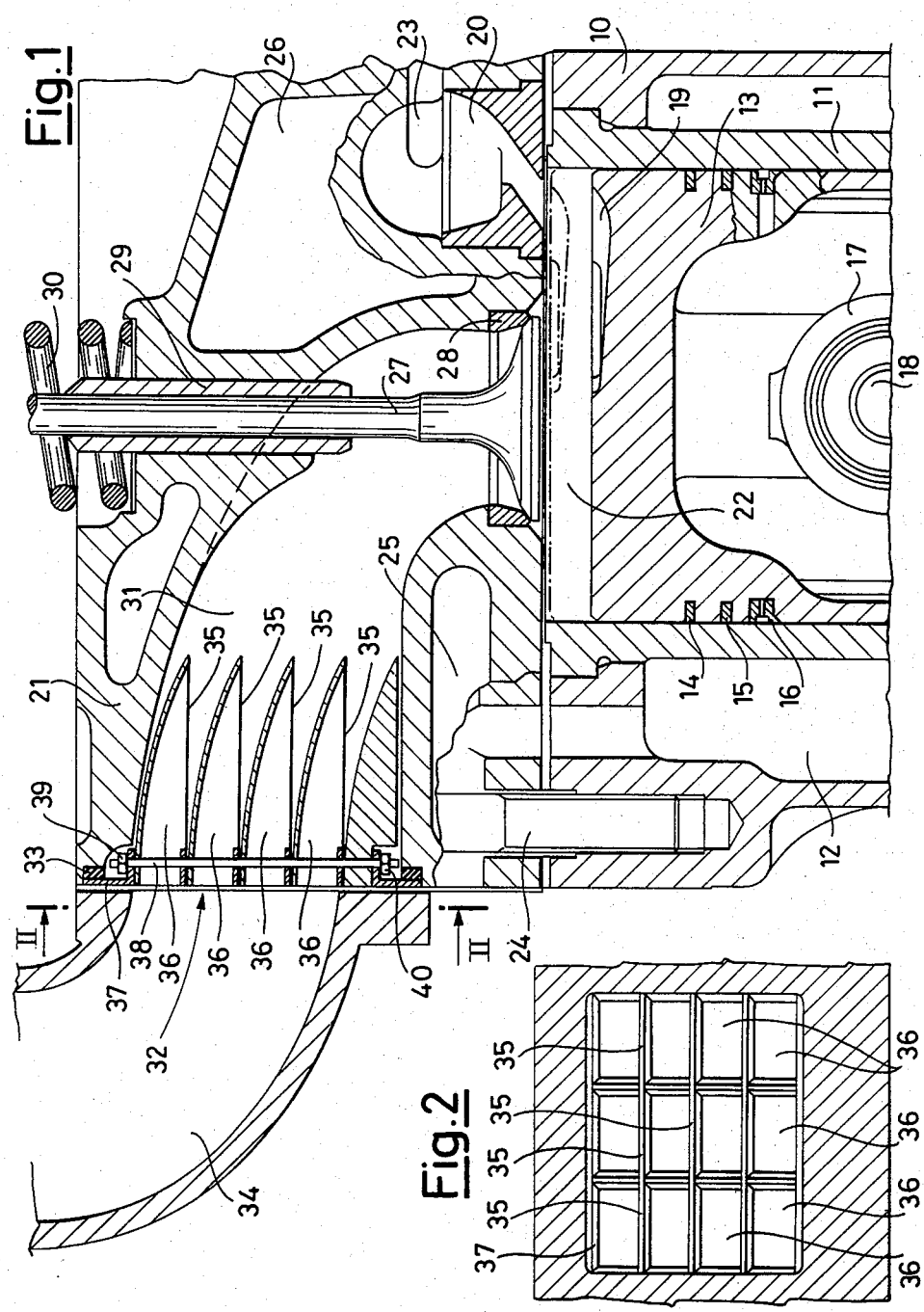

DIESEL ENGINE WITH AN EFFECTIVE COMPRESSION RATIO SUBSTANTIALLY EQUAL TO THE GEOMETRICAL COMPRESSION RATIO

In diesel engines, the geometrical ratios, defined as the ratio of the maximum to the minimum cylinder volume, are generally of high value in order to overcome the diesel oil ignition difficulties on starting the engine from cold. Under these conditions, the heat loss through the walls is of a greater percentage, and the end-of-compression pressure necessary to enable the air temperature to reach the required value for igniting the diesel oil is greater than that necessary when the engine has reached its normal temperature.

Such high geometrical compression ratios are necessary to obtain sufficiently high effective compression ratios, because as these latter depend on the ratio of the air volume at the instant of intake valve closure to the volume of the same air at the end-of-compression T.D.C., they can be equal to or slightly greater than the geometrical compression ratio only in those operating states in which the cylinder filling is favoured by resonance phenomena and inertial effects, due to the delay in the closure of the intake valve, whereas in other operating states, and in particular on starting, the effective compression ratios are less than the geometrical compression ratio because part of the air flows back into the intake duct during the initial part of the compression stroke, due to the delay in the closure of the intake valve.

If geometrical compression ratios are high, greater difficulties are encountered in engine mass production, because greater accuracy is required in the machining and assembly of the parts in order to limit the spread of actual values relative to the design values for the individual cylinders of an engine and for the various engines themselves.

The normal constructional drawbacks have been obviated by providing a diesel engine with an effective compression ratio substantially equal to the geometrical compression ratio, the individual engine intake ducts being fitted with automatic non-return valves arranged to prevent the air flowing to the outside, and disposed immediately upstream and in series with the normal intake valves. The non-return valves, which close the intake duct when a positive pressure difference exists between the inside and outside, minimise the air throughput which can flow back from the cylinder to the outside during the initial part of the compression stroke due to the delay in the closure of the intake valve. The result is a greater degree of cylinder filling even at low engine speeds, and an increase in the effective compression ratio, so that the geometrical compression ratio can be chosen at a considerably lower value, thus improving the tolerance range for mass production.

The reduction in the geometrical compression ratio also leads to an improvement in the thermodynamic efficiency of the cycle due to the reduced heat loss through the walls, as the surface/volume ratio of the combustion chamber is smaller.

On the other hand, if a high geometrical compression ratio is maintained, the use of said non-return valves enables the diesel engine to be started without difficulty, even at very low ambient temperatures.

Characteristics and advantages of the invention will be more apparent from an examination of the accompanying FIGS. 1 and 2, which show a preferred embodiment of the invention by way of non-limiting example.

FIG. 1 is a partial section on a longitudinal plane through a diesel engine of the precombustion chamber type constructed in accordance with the invention.

FIG. 2 is a section on the line II—II.

In FIG. 1, the reference numeral 10 indicates the engine cylinder block, 11 a cylinder liner, 12 the chamber for the cooling liquid of said cylinder, 13 the piston, 14, 15, 16 the piston rings, 17 the connecting rod small end and 18 the piston pin. The reference numeral 19 indicates the combustion chamber provided in the piston crown, and 20 the precombustion chamber provided in the engine head 21. The reference numeral 22 indicates the combustion chamber situated between the piston, the cylinder and the engine head.

FIG. 1 shows the preheating plug 23 disposed in the precombustion chamber 20, whereas the diesel oil injector disposed in the said precombustion chamber is not shown.

The reference numeral 24 indicates one of the studs which fix the engine head 21 to the cylinder block 10, and 25 and 26 indicate the chambers for the engine head cooling liquid. The reference numeral 27 indicates the intake valve, 28 its seat, 29 the valve guide and 30 the return spring for said valve.

In the figure, the reference numeral 31 indicates the intake duct provided in the engine head, 32 indicates a bank of automatic non-return valves flanged to the engine head 21 together with the intake duct connector 34, by way of the gasket 33.

As can also be seen from FIG. 2, the bank 32 of non-return vaves is constituted by side-by-side overlying sets of resilient foils 35 and arcuate-based channels 36, which are fixed as a pack to a support frame 37 by pins 38 and nuts 39 and 40. The foils 35 are slightly preloaded, and rest against the free edges of the channels 36 in order to shut them off.

During the intake stage of the piston 13, a positive pressure difference is created between the ducts 34 and 31, and if it exceeds a minimum value it lifts the foils 35 and opens the channels 36, to feed air to the cylinder 11.

When said pressure difference is nullified or reverses in sign, the foils 35 again close the channels 36 to prevent reverse flow of air from the duct 31 to the duct 34.

Thus the air which would tend to flow back into the intake duct 34 during the first part of the compression stroke due to the delay in the closure of the intake valve 27 is intercepted by the closure of the foils 35, and is compelled to remain in the cylinder 11, due to the slight overpressure created in the duct 31.

The result is an increase in the cylinder filling, and an increase in the effective compression ratio to values which are substantially equal to the geometrical compression ratio, even at low rotational speeds and on cold-starting the engine.

The air which flows back into the duct 31 is again drawn in by the cylinder at the commencement of the next intake stage, and because of the slight overpressure which it possesses it contributes to the expelling of the burnt gas present in the cylinder, with good scavenging effect even at low rotational speeds.

In FIG. 1 the piston 13 is shown by full lines in its T.D.C. position corresponding to a geometrical compression ratio of 18:1, and is shown by dashed and dotted lines in the T.D.C. position corresponding to the geometrical compression ratio of 22:1, which it would be necessary to use for correct cold-starting of the engine if the non-return valves 32 were not provided according to the present invention in the intake duct 31 immediately upstream of the intake valve 27.

It should be noted that the distance between the piston positions in the two cases has been enlarged in order to show the difference between these two situations.

As stated, the proposed arrangement has also the advantage of reducing the heat losses through the walls because the surface area/volume ratio of the combustion chamber is less than with a higher geometrical compression ratio.

Moreover, with this arrangement it is possible to increase the delay in the closure of the intake valve without penalising volumetric efficiency, and indeed with the indirect advantage of being able to increase the lifts of the intake valve for equal accelerations, to give greater angular duration of the opening stage of said valve.

We claim:

1. A diesel internal combustion engine of the type having a cylinder, a piston mounted in said cylinder for reciprocating movement, an intake duct for air, and an intake valve between said cylinder and said intake duct, said intake valve having a timing means relative to the movement of said piston wherein said intake valve is open during an initial part of a compression stroke of said piston wherein there is a back flow of intake gases during an initial part of said compression stroke which would evolve an effective compression ratio less than a calculated geometric compression ratio, and automatic non-return valve means within said intake duct immediately upstream of said intake valve and in series with said intake valve for restricting intake air back flow into said intake duct during said initial part of said compression stroke, said non-return valve means forming means for providing an effective compression ratio substantially equal to said geometrical compression ratio.

2. An engine as claimed in claim 1, characterised in that said non-return valve means are constituted by a side-by-side overlying set of arcuate-based channels having free edges, and slightly preloaded resilient foils which rest against the free edges of said channels in order to shut them off.

* * * * *